Figure 1:
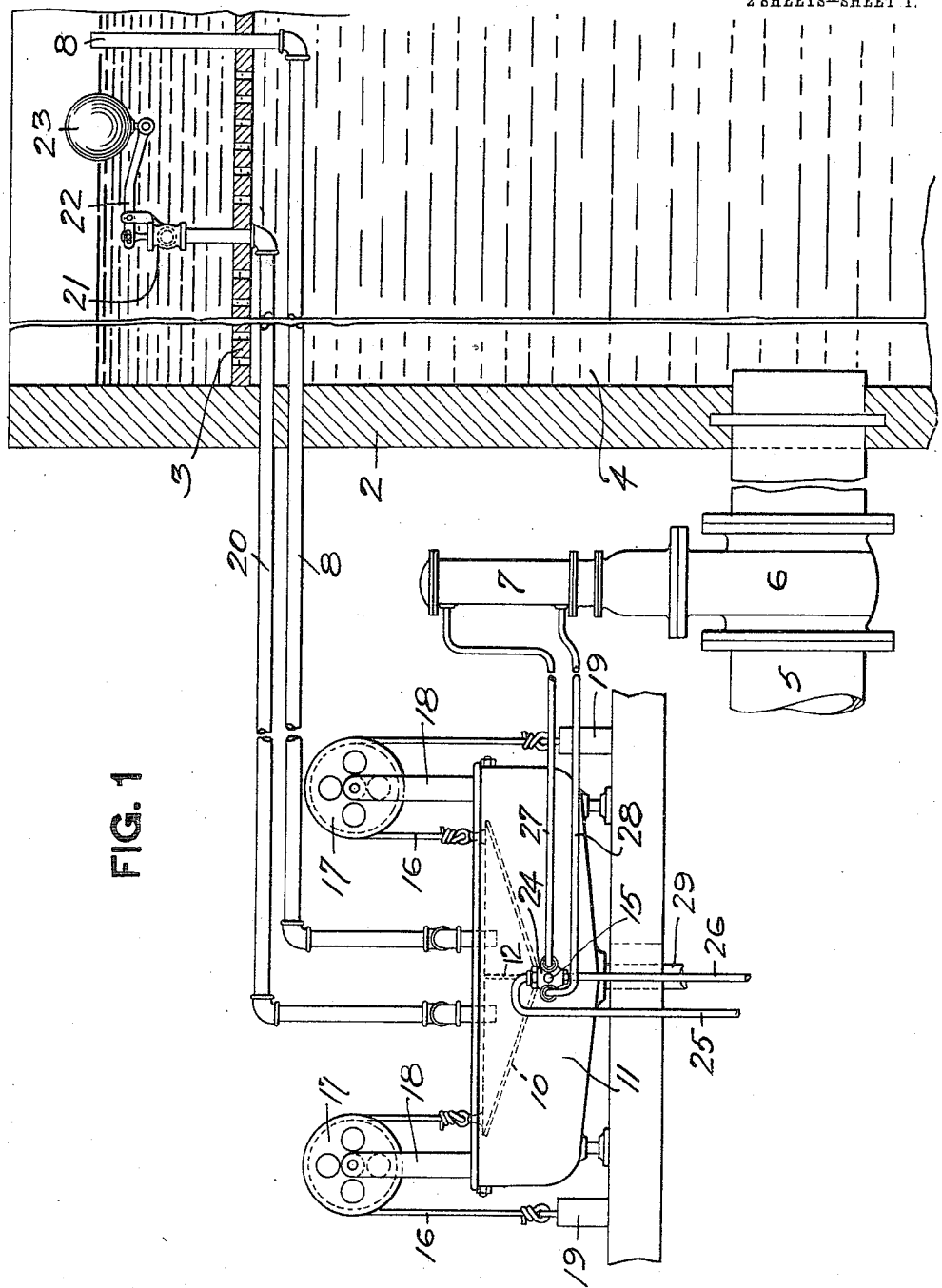

F. B. LEOPOLD.
INLET CONTROLLER FOR LIQUIDS.
APPLICATION FILED JUNE 28, 1909.
964,528.
Patented July 19, 1910.
2 SHEETS—SHEET 2.
FIG. 2
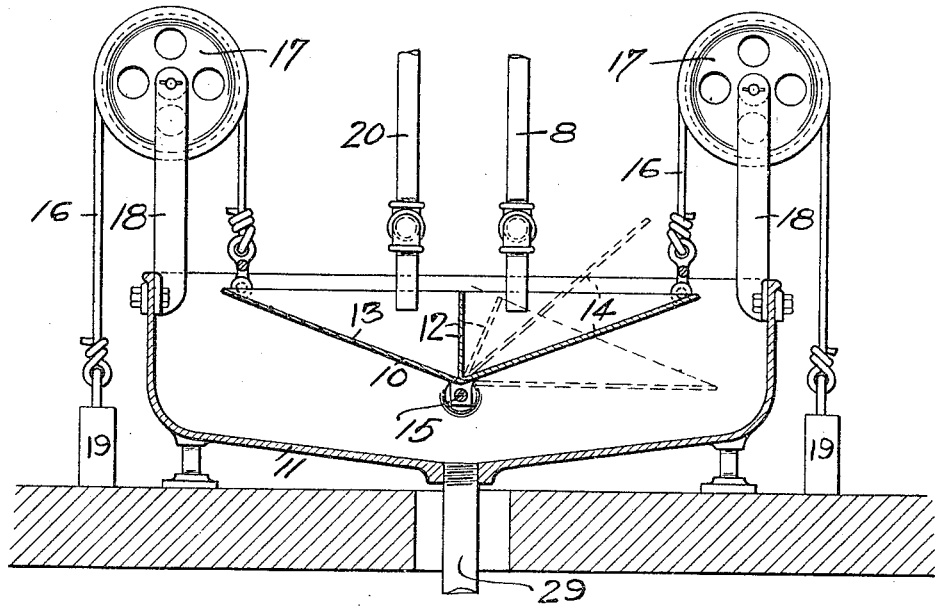
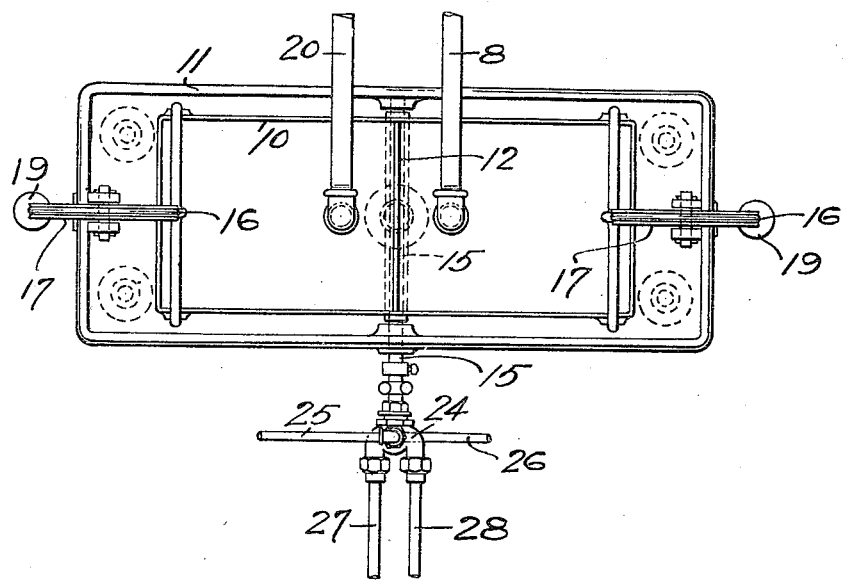
FIG. 3
WITNESSES.
INVENTOR.

UNITED STATES PATENT OFFICE.

FREDERICK B. LEOPOLD, OF SEWICKLEY, PENNSYLVANIA.

INLET-CONTROLLER FOR LIQUIDS.

964,528.  Specification of Letters Patent.  Patented July 19, 1910.

Application filed June 28, 1909. Serial No. 504,827.

*To all whom it may concern:*

Be it known that I, FREDERICK B. LEOPOLD, a resident of Sewickley, in the county of Allegheny and State of Pennsylvania, have invented a new and useful Improvement in Inlet-Controllers for Liquids; and I do hereby declare the following to be a full, clear, and exact description thereof.

My invention relates to an inlet controller for liquids.

The main object of my invention is to provide a controller of this character adapted for use in connection with the controlling of the supply of water to sedimentation basins in connection with filter plants in which the water is maintained accurately at the desired level within the basin automatically, so that the parts when once adjusted will control the supply of liquid without further attention.

To these ends my invention comprises, generally stated, a suitable basin or reservoir, an overflow pipe and an automatic valve control pipe leading from said basin and adapted to discharge onto a movable member, a valve controlling the supply of liquid to the said basin, and means for operating said valve by the movement of said member by the flow of water from said pipes thereon, whereby the supply of liquid is controlled to maintain the water level in said basin at a predetermined height.

In the accompanying drawings Figure 1 is an elevation partly in section of my improved controller; Fig. 2 is an enlarged longitudinal section of controlling device; and Fig. 3 is a plan view of the valve controlling device.

While I have illustrated my invention in connection with the sedimentation basin of a filtration plant I wish it understood that I do not limit myself in any way to such use, as the invention may have many and various uses.

The numeral 2 designates the portion of a suitable sedimentation basin with the stilling plate 3 through which the water passes up into the sedimentation basin, the water being fed to the chamber 4 by the influent pipe 5 which is controlled by the gate valve 6 operated by the hydraulic cylinder 7.

An overflow pipe 8 has its inlet end located slightly above the water level and the discharge end of said pipe opens out onto the pan 10 in the trough 11. This pan 10 is divided by the partition 12 and has the sloping bottom plates 13 and 14. The pan 10 is mounted on the rock shaft 15 which is journaled in the sides of the trough 11. Secured to opposite ends of the pan 10 are the cables 16 which pass up and around the pulleys 17 on the standards 18 supported by the trough 11. Weights 19 are secured to the ends of the cables 16. Normally the weights 19 act to balance the pan 10 so that the partition 12 is in a vertical or substantially vertical position. The overflow pipe 8 discharges into one section of the pan and the pipe 20 discharges into the other section of said pan. This pipe 20 leads from the sedimentation basin below the water level and its inlet is controlled by a suitable valve 21. A lever 22 is connected to the stem of said valve and a float 23 is secured to the end of said lever. It is apparent that as the water level in the sedimentation basin descends the float will likewise descend and open the valve 21 to permit the water to flow through the pipe 20 onto the pan 10.

The rock shaft 15 is connected up to the four-way cock 24 which may be of any suitable construction. This 4-way cock has the pressure pipe 25 connected up thereto, as well as the pipe 26 leading to the sewer and the pipes 27 and 28 leading to the upper and lower ends of the hydraulic cylinder 7 respectively. Leading from the trough 11 is the waste pipe 29.

When my improved controller is in use the water rises within the sedimentation basin and the valve 6 normally supplies sufficient liquid to maintain the water level at the proper height. If, however, the water level should descend the float 23 will be lowered and the valve 21 opened to allow a certain quantity of fluid to pass through the pipe 20 into the one section of the pan 10. The discharge of the water into the pan 10 will act to destroy the balance maintained by the weights 19 and accordingly the pan will tip to one side, as indicated in dotted lines, Fig. 2, and this tipping of the pan will rock the shaft 15 and operate the 4-way cock 24 so as to admit the water from the pressure pipe to the pipe 28 leading to the lower end of the cylinder 7. This will operate to raise the valve 6 and admit a greater quantity of liquid to the pipe 5 and consequently the water level in the sedimentation basin will be raised to the proper level. As soon as the proper level has been reached the float 23 will close the valve 21 and the water in the pipe 20 will be cut off so that the water is discharged into the pan 10. As the tilting of the pan 10 discharges the water admitted thereto from the pipe 20, the cutting off of the supply from the pipe 20 permits the weights 19 to act to bring the pan to its normal position and through the rock shaft 15 the supply from the pressure pipe to the pipe 28 is cut off. The water then passes through the pressure pipe 25 directly to the sewer pipe 26. If, on the other hand, the water in the sedimentation basin reaches a point above the desired water level it will overflow into the overflow pipe 18 and pass into the pan 10 where it will act to tilt the pan 10 in the opposite direction and so operate the 4-way cock 24 to permit the water from the pressure pipe 25 to pass through the pipe 27 to the upper end of the hydraulic cylinder 7 and lower the valve 6, whereby the supply through the pipe 5 to the sedimentation basin will be diminished. As soon as the water passes below the upper end of the discharge pipe 8 the pan 10 will resume its normal position and close the valve 24, thereby cutting off the supply of liquid to the upper end of the hydraulic cylinder 7. The exhaust from the hydraulic cylinder 7 is through the pipe 28 to the sewer pipe 26.

In the above manner the improved controller operates automatically to maintain the water at the proper level in the sedimentation basin and when the parts are once adjusted properly the device operates without the attention of any one.

What I claim is:

1. In a controller, the combination of a suitable reservoir, a supply main leading thereto, a valve in said supply main, a fluid operated cylinder controlling said valve, pipe connections leading to said fluid operated cylinder from the fluid supply, a tilting member, means for controlling the supply of fluid to said fluid operated cylinder by said tilting member, and means for tilting said member by liquid directed thereon from said reservior.

2. In a controller, the combination of a suitable reservoir, a supply main leading thereto, a valve in said supply main, a fluid operated cylinder controlling said valve, pipe connections leading from a fluid supply to said fluid operated cylinder, a valve controlling the supply of fluid to said pipe connections, a tilting member, connections between said tilting member and said valve, and means for directing water from said reservoir to said tilting member.

3. In a controller, the combination of a suitable reservoir, a supply main leading thereto, a valve in said supply main, a fluid operated cylinder controlling said valve, pipe connections leading from a fluid supply to said fluid operated cylinder, a valve controlling the supply of fluid to said pipe connections, a tilting member, connections between said tilting member and said valve, and means for directing the water to opposite sides of said tilting member.

4. In a controller, the combination of a suitable reservoir, a supply main leading thereto, a valve in said supply main, a fluid operated cylinder controlling said valve, pipe connections to said fluid operated cylinder from a fluid supply, a valve controlling the fluid supply to said pipe connections, a divided tilting pan, connections between said pan and said valve controlling the fluid supply to said pipe connections, and means for tilting said pan by the discharge of water from said reservoir.

5. In a controller, the combination of a suitable reservoir, a supply main leading thereto, a valve in said supply main, a fluid operated cylinder connected to said valve, pipe connections leading to said fluid operated cylinder, a rock shaft, a pan on said rock shaft, a valve controlling the supply of fluid to said fluid operated cylinder, connections between said valve and said rock shaft and means for directing liquid from said reservoir to said pan to tilt the same in opposite directions.

6. In a controller, the combination of a suitable reservoir, a supply main leading thereto, a valve in said main, a fluid operated cylinder connected to said valve, pipe connections leading to said fluid operated cylinder, a valve controlling said pipe connections, a tilting pan, means for operating said last named valve by the movement of said tilting pan, an overflow pipe leading from said reservoir to one side of the axis of said tilting pan, and a second pipe leading from said reservoir to the opposite side of said tilting axis, and a float-controlled valve in said pipe.

7. In a controller, the combination of a suitable reservoir, a supply main leading thereto, a valve in said supply main, a fluid operated cylinder connected to said valve, pipe connections to said fluid operated cylinder, a valve controlling said pipe connections, a counter-balanced tilting pan, connections between said tilting pan and said last named valve to operate the same, and means for directing water from said reservoir to opposite sides of the axis of said tilting pan.

In testimony whereof, I, the said FREDERICK B. LEOPOLD, have hereunto set my hand.

FREDERICK B. LEOPOLD.

Witnesses:
ROBERT C. TOTTEN,
JOHN F. WILL.